United States Patent [19]

Chaney et al.

[11] 3,988,058
[45] Oct. 26, 1976

[54] REAR-VIEW MIRROR DEVICE FOR ATTACHMENT TO THE ACCESSORIES OF THE USER

[75] Inventors: David R. Chaney, Chardon; David G. Wendel, Novelty, both of Ohio

[73] Assignee: Safety Sports Mirror Co., Chardon, Ohio

[22] Filed: Mar. 27, 1975

[21] Appl. No.: 562,505

[52] U.S. Cl. .................................. 350/298; 2/199; 2/DIG. 8; 248/481; 351/50
[51] Int. Cl.² .......................................... G02B 7/18
[58] Field of Search ................. 350/248, 288, 298; 351/50; 2/185 R, 199, DIG. 8; 248/481, 484, 485

[56] References Cited
UNITED STATES PATENTS

| 2,910,915 | 11/1959 | Harris ........................ 350/288 UX |
| 2,917,970 | 12/1959 | LaBard ......................... 351/50 X |
| 2,968,995 | 1/1961 | Holden ........................ 248/481 X |

FOREIGN PATENTS OR APPLICATIONS

| 657,303 | 1/1929 | France ........................... 248/485 |
| 518,028 | 3/1955 | Italy ............................... 351/50 |
| 405,521 | 2/1934 | United Kingdom ............ 350/298 |

Primary Examiner—John K. Corbin
Assistant Examiner—F. L. Evans
Attorney, Agent, or Firm—William N. Hogg

[57] ABSTRACT

A rear-view mirror assembly for mounting on various types of apparel such as the frame of eyeglasses, the peak of a cap, a helmet, etc is disclosed. The device includes a body which has an attachment member at one end thereof. A U-shaped mirror supporting arm is provided having a ball and socket connection at the end of one arm of the U-shaped arm swively connected to the end of the body member. The other arm has a ball and socket connection with a mirror mounting device in which is mounted a mirror.

8 Claims, 5 Drawing Figures

U.S. Patent  Oct. 26, 1976  3,988,058
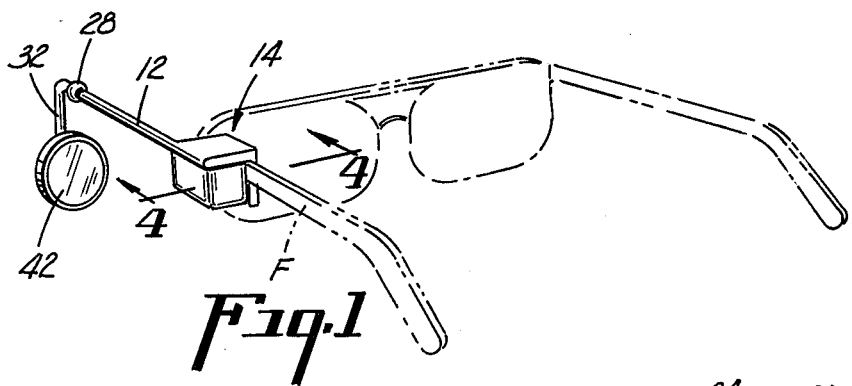
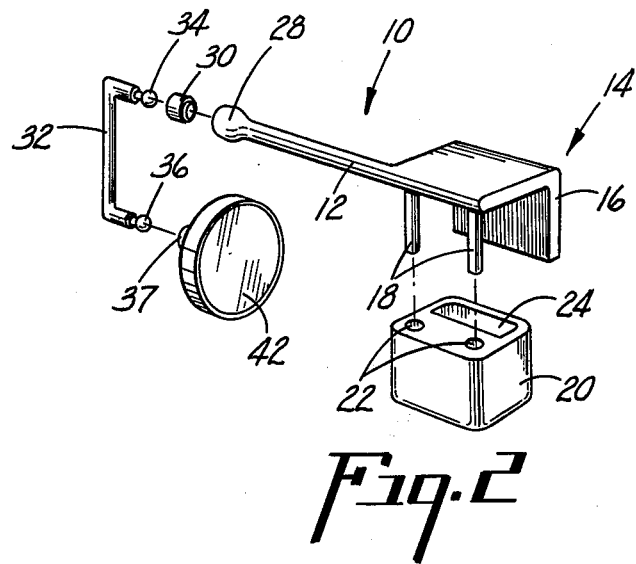
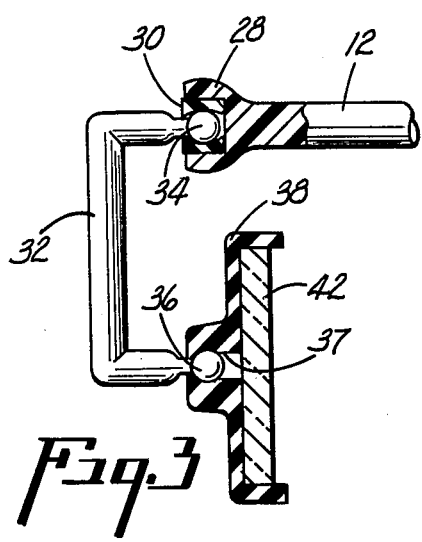
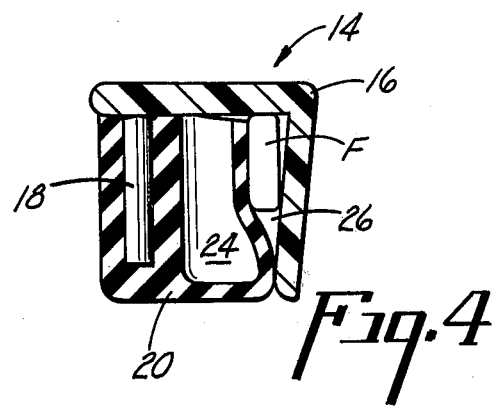
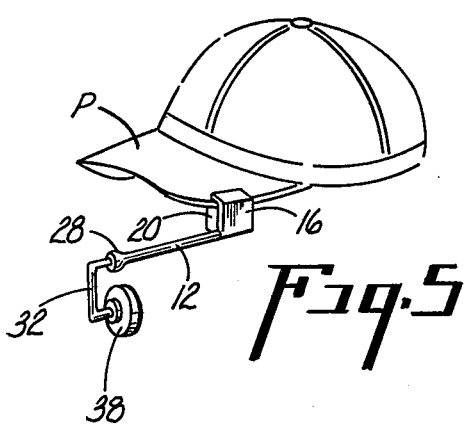

REAR-VIEW MIRROR DEVICE FOR ATTACHMENT TO THE ACCESSORIES OF THE USER

BACKGROUND OF THE INVENTION

There have been many prior art proposals for rear-view mirror assemblies which can be mounted on the apparel of the user, such as the frame of eyeglasses, for the use of cyclists, runners, and other athletes. All of these have suffered from various limitations and drawbacks. Some have been severely limited in their ranges of possible adjustments making their use and desirability quite limited. Others have had mountings which did not effectively mount the device on the apparel or required special mounting techniques and special mounting preparation and configurations. Still others were made of dangerous material or material that would injure a rider upon an accident or would become bent, deformed, or permanently broken upon an accident and therefore not usable.

The device of this invention overcomes these and other limitations and provides a rear-view mirror assembly for use by cyclists and other athletes and sportsmen which can be easily and securely mounted to various types of apparel of the user such as eyeglasses, caps, goggles, etc., has a wide range of adjustments for different types of mounting, and is safe and resistant to permanent damage on impact.

SUMMARY OF THE INVENTION

According to the present invention a rear-view mirror assembly for attachment to the apparel of the user is provided. The mirror assembly has a body portion having attachment means at one end thereof for attachment to the frame of the eyeglasses or the peak of a cap or other similar apparel which attachment means includes resilient cushioning means forming a slot for such engagement. At the other end of the body member a U-shaped mirror supporting arm is provided, which arm is swivelly connected thereto with a ball and socket construction preferably utilizing elastomeric material for frictional purposes. The other end of the U-shaped arm is secured to a mirror mounting device by a ball and socket construction, also which is preferably an elastomeric connection for frictional purposes.

DESCRIPTION OF THE DRAWING

FIG. 1 is a perspective view of the device in this invention showing it attached to the frame of eyeglasses which eyeglasses are shown in phantom outline;

FIG. 2 is an exploded perspective view of the device of this invention on a scale enlarged from that of FIG. 1;

FIG. 3 is a longitudinal sectional view showing the mounting of the U-shaped arm to the body member and to the mirror supporting arm and showing these in detail;

FIG. 4 is a sectional view taken substantially along the plane designated by the line 4—4 of FIG. 1; and FIG. 5 is a perspective view similar to FIG. 1 showing the device mounted on the visor of the cap.

DESCRIPTION OF THE PREFERRED EMBODIMENT

Referring now to the drawing, a rear-view mirror assembly according to this invention is shown. The mirror assembly includes a body member 10 which has a stem portion 12 having an attachment member designated generally as 14 disposed at one end thereof for attaching the device to the frame of eyeglasses or the visor of a cap or other wearing apparel, etc. The attachment member 14 includes an L-shaped end piece 16 with a pair of pegs or legs 18 depending from one leg of the L. A generally rectilinear elastomeric cushion 20 is provided which has a pair of bores 22 corresponding in size and positon to the legs 18 so that the cushion 20 can be slipped onto the legs 18 and fit snugly thereon with the elastomeric cushion secured to the L-shaped end piece 16. The cushion 20 is provided with a central pocket 22 and when in position defines with the end piece 16 a groove 24 therebetween which groove is adapted to receive the frame F of a pair of eyeglasses or the peak P of a visor cap. The elastomeric cushion 20 is so shaped that in its normal position it fits snugly against both the top and the side of the L-shaped member 16 but that upon pressure the cushion will collapse and provide a reaction to pressure against the frame of the glasses F to securely mount the device on the frame but still allow for adjusting motion, the mounting not being so tight or rigid that the mirror assembly cannot be adjusted longitudinally along the frame by pressure. However, the resiliency of the cushioning material is sufficient to hold the device in place once it is in place to prevent unintentional moving.

At the other end of the stem member 12 a socket 28 is provided into which is inserted a separable elastomeric sleeve 30. This provides a universal mounting for a U-shaped mirror supporting arm 32 having at the end of one arm thereof a ball 34 disposed to slide into and frictionally engage the sleeve 30 within the socket 28 and thereby provide a swivellable type mounting of the U-shaped arm 32 in the socket 28 but with sufficient friction generated by the elastomeric sleeve 30 to allow the mirror to remain in a set position once adjusted but nevertheless allow adjustment where intended. This will prevent unintentional movement of the mirror under normal movement of the operator and normal mounting thereon.

The end of the other arm of the U-shaped member 32 is also provided with a ball 36 which fits into socket 37 of mirror mounting device 38. The mirror mounting device 38 is made of an elastomeric material and will frictionally engage the ball 36 which will provide resistance against unintentional movement but allow adjustment of the mirror for proper adjustment in any given position, the mirror remaining in the given adjusted position. The mirror mounting device 38 includes an annular rim 40 adapted to peripherally engage and retain a mirror 42.

As can be seen, this particular configuration of a rear-view mirror assembly allows for attachment to various different articles of apparel such as eyeglasses shown in FIG. 1 and the brim of a cap as shown in FIG. 5 as well as may other types of apparel such as goggles, helmets, etc. This is possible because of the double swivel construction with the U-shaped mirror supporting arm 32 swivelly mounted both to the end of the stem 10 and to the mirror mounting means 38 to allow swivellable adjustment at both of these positions. Thus there is no specific limitation as to how the device must be mounted in orientation to the user with respect to any apparel, but it can be mounted sideways, up and down, or at an angle, depending on which piece of apparel is used for attachment. Also, this unique swivel construction and mounting device allows for easy and very wide ranges of adjustment of the mirror in different operating positions to suit the user's convenience and the necessities of the particular situation in which the device is being used.

Further, it should be noted that the two ball and socket mounting constructions are breakaway type of attachments which under impact will allow these parts to break away and not become damaged due to impact. Further, this breakaway construction limits the possibility of injury to the user, especially to the user's eyes or ears or other vulnerable parts of the head, the device tending to break away into various parts rather than act with full force against the user in an unyielding manner as many prior art devices do. Further, the mounting of the elastomeric cushioning means on the body member also allows the device to fall off the glasses rather than be retained thereon and damage either the device or the user.

Additionally, the body and the U-shaped arm are preferably made up of semi-rigid plastic; i.e. plastic which is sufficiently rigid to retain its shape and spring back to its given shape without being permanently set, but which is not a fully hardened plastic and which will bend under impact thereby lessening any tendency toward injury to the user, but still retaining its shape under normal use and under normal handling without being bent permanently out of shape.

Thus according to the present invention a rear-view mirror assembly is provided which is quite safe for the user which can be utilized in many different configurations and which can be easily set and maintain its position and which will tend to break away into various components rather than become broken itself.

What is claimed is:

1. A rear-view mirror assembly for attachment to the frame of eyeglasses, goggles, peaks of caps, and the like comprising, an elongated body member having attachment means at one end thereof, a generally U-shaped mirror supporting member, first ball and socket means frictionally swivelly connecting one leg of said mirror supporting member to the opposite end of said body member for universal movement, a mirror and means mounting said mirror, second ball and socket means frictionally swivelly connecting the other leg of said mirror supporting member to said means mounting the mirror for universal movement, whereby to provide maximum adjustment of said mirror.

2. The invention as defined in claim 1 wherein the socket means are formed of elastomeric material compressingly engaging their respective ball means.

3. The invention as defined in claim 1 wherein the mirror mounting means includes elastomeric means grippingly engaging the periphery of the mirror.

4. The invention as defined in claim 1 further characterized by said attachment means including a slot defined on at least one side by resilient cushion means to grip a solid object.

5. The invention as defined in claim 4 wherein the slot is defined on one side by resilient cushion means and on the other side by relatively non-resilient means.

6. The invention as defined in claim 5 further characterized by means to removably mount said cushion means on the end of said body member.

7. The invention as defined in claim 1 wherein said ball and socket means are configured for detachable mounting and are detachable upon impact.

8. The invention as defined in claim 2 wherein the elastomeric material for the socket connecting the body member to the mirror supporting member is in the form of a tubular sleeve detachably mounted on one of said members and coacting with the ball formed on the other of said members.

* * * * *